(12) United States Patent
Westwick et al.

(10) Patent No.: US 7,802,113 B2
(45) Date of Patent: Sep. 21, 2010

(54) MCU WITH ON-CHIP BOOST CONVERTER CONTROLLER

(75) Inventors: Alan L. Westwick, Austin, TX (US); Ka Y. Leung, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 915 days.

(21) Appl. No.: 11/618,433

(22) Filed: Dec. 29, 2006

(65) Prior Publication Data

US 2007/0132436 A1    Jun. 14, 2007

Related U.S. Application Data

(63) Continuation-in-part of application No. 11/301,579, filed on Dec. 13, 2005, now Pat. No. 7,493,505.

(51) Int. Cl.
*G06F 1/26* (2006.01)
(52) U.S. Cl. ........................ 713/300; 713/320
(58) Field of Classification Search ................ 713/300, 713/320, 340; 323/282, 284
See application file for complete search history.

(56) References Cited

U.S. PATENT DOCUMENTS

| | | | | |
|---|---|---|---|---|
| 5,274,828 | A * | 12/1993 | McAdams | 713/300 |
| 5,483,182 | A * | 1/1996 | Rybicki | 327/5 |
| 5,757,714 | A * | 5/1998 | Choi et al. | 365/226 |
| 6,335,900 | B1 * | 1/2002 | Kwon et al. | 365/230.06 |
| 6,848,055 | B1 | 1/2005 | Yarch | |
| 6,927,619 | B1 | 8/2005 | Doyle | |
| 7,031,219 | B2 | 4/2006 | Hsu et al. | |
| 7,110,317 | B2 | 9/2006 | Song et al. | |
| 2003/0011332 | A1 * | 1/2003 | Mays, II | 318/254 |
| 2003/0026115 | A1 * | 2/2003 | Miyazaki | 363/53 |
| 2004/0090820 | A1 | 5/2004 | Pathak et al. | |
| 2004/0119453 | A1 | 6/2004 | Clark et al. | |
| 2004/0140791 | A1 * | 7/2004 | Plgott | 323/282 |

* cited by examiner

*Primary Examiner*—Mark Connolly
*Assistant Examiner*—Paul B Yanchus, III
(74) *Attorney, Agent, or Firm*—Howison & Arnott, L.L.P.

(57) ABSTRACT

An integrated system on a chip includes processing circuitry that performs predefined digital processing functions on the chip. The processing circuitry operates responsive to a regulated voltage. An on-chip boost converter generates the regulated voltage responsive to an off-chip voltage provided by an off chip voltage source. The regulated voltage source has a voltage level greater than the off-chip voltage.

24 Claims, 4 Drawing Sheets

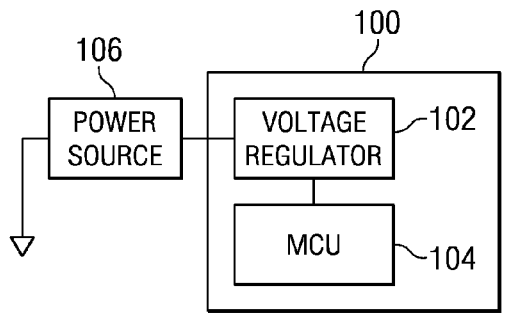
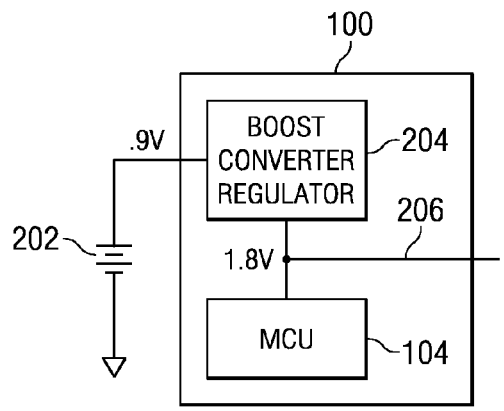
FIG. 1
FIG. 2
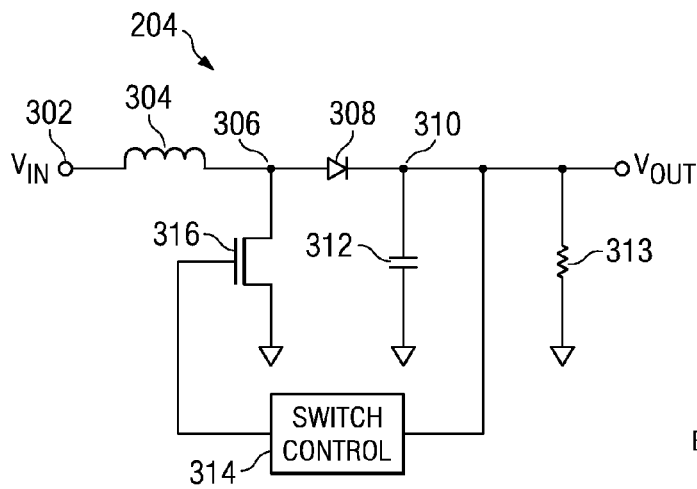
FIG. 3
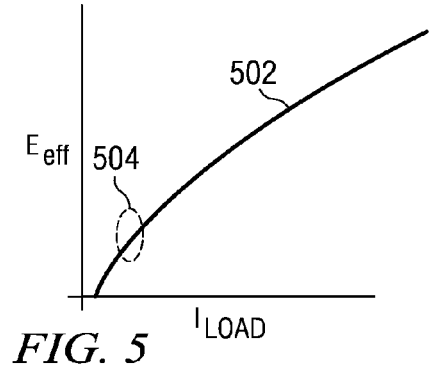
FIG. 5
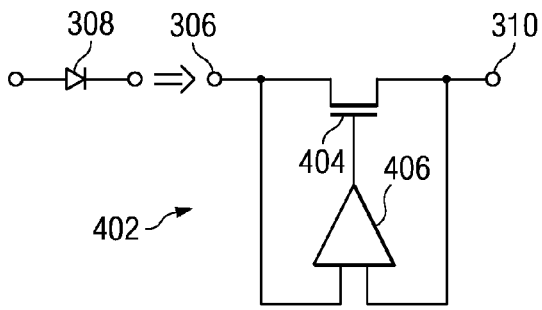
FIG. 4
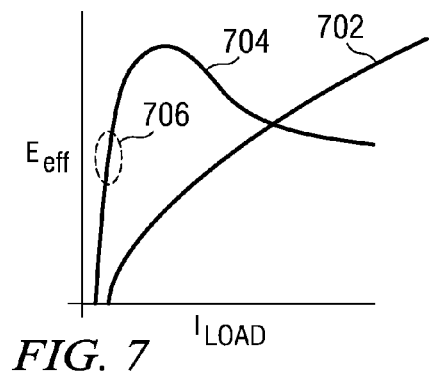
FIG. 7

MCU WITH ON-CHIP BOOST CONVERTER CONTROLLER

RELATED APPLICATIONS

This application is a continuation-in-part of co-pending U.S. patent application Ser. No. 11/301,579 entitled "MCU With Low Power Mode of Operation", which is incorporated herein by reference.

TECHNICAL FIELD OF THE INVENTION

The present invention relates to power regulators, and more particularly, to MCU devices including an on-chip boost converter.

BACKGROUND OF THE INVENTION

Microcontroller units often include both on-chip analog peripheral devices and on-chip digital peripheral devices. The microcontroller units are powered by power supplies and/or batteries that provide voltage levels to the MCU device over a wide range of voltages. In many applications the voltage is supplied to the microcontroller at a voltage that is too high for the digital peripheral devices upon the microcontroller unit chip thus requiring the use of a voltage regulator to regulate the voltage from an applied voltage level to a regulated level usable by the digital peripheral devices.

Another problem which arises from power sources applied to a MCU device chip occurs when the voltage level applied from, for example, a battery, is lower than the voltage level required for operation of the digital peripheral devices within the microcontroller unit device chip. When this occurs, it is necessary to increase the voltage within the chip in order to obtain the necessary voltages. Present implementations make use of boost converter devices which are located external of the chip including the microcontroller unit. This requires additional space and circuitry other than that normally needed by only the microcontroller device chip. Thus, the chip requires the use of additional area for mounting of the circuitry associated with the boost converter. Thus, there is a need for a microcontroller unit device chip which does not require the use of external boost converter regulators in order to obtain voltage levels necessary to operate the digital peripherals and the microcontroller on the chip when a power source such as a battery provides voltage levels below those necessary to operate the digital peripherals and the microcontroller.

SUMMARY OF THE INVENTION

The present invention disclosed and claimed herein, in one aspect thereof, comprises an integrated system on a chip including processing circuitry for performing pre-defined digital processing functions on the chip. The processing circuitry operates responsive to a regulated voltage that is provided from an on-chip boost circuit. The on-chip boost circuit generates the regulated voltage responsive to an off-chip voltage provided by an off-chip voltage source. The regulated voltage has a voltage level that is greater than the voltage level of the off-chip voltage.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates an MCU device chip having an on-chip voltage regulator;

FIG. 2 illustrates an MCU device chip having an on-chip boost regulator providing a regulated voltage to an internal MCU device and to an external output;

FIG. 3 is a schematic diagram of a boost converter;

FIG. 4 illustrates the manner in which the diode element of the boost converter may be replaced with a zero volt turn-on rectifier;

FIG. 5 illustrates the efficiency versus load current for a typical boost converter;

FIG. 7 illustrates the efficiency verses current load level for the two modes of operation of the boost converter of FIG. 6;

DETAILED DESCRIPTION OF THE INVENTION

Figure 6:
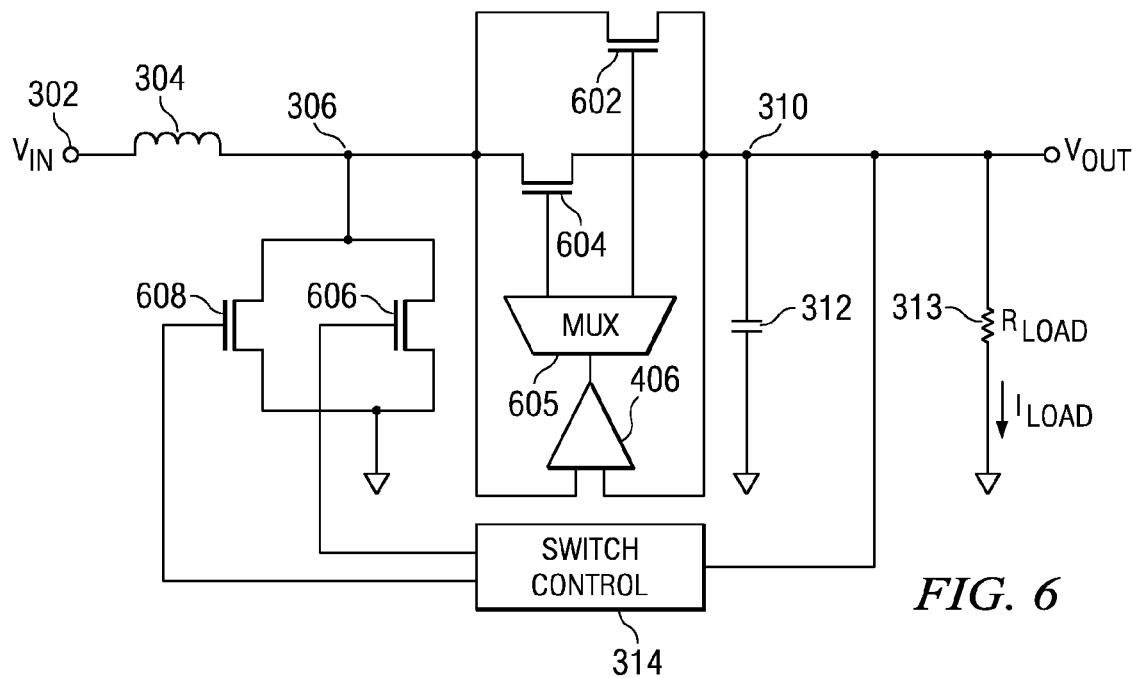
FIG. 6 illustrates a schematic diagram of a boost converter having selectable power efficiency levels responsive to the operating conditions of an MCU device.

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

Referring now to the drawings, and more particularly to FIG. 1, there is illustrated a MCU device including an on-chip voltage regulator 102. The MCU 104 requires a particular voltage level in order to properly operate the analog and peripheral devices upon the chip. A power supply 106 provides a voltage within a particular range to the voltage regulator 102. The voltage regulator 102 regulates this voltage to a level necessary to operate the MCU 104 and other peripheral digital devices upon the chip 100. The voltage regulator 102 may in some embodiments comprise the well known buck converter that is capable of providing smaller voltages from a greater voltage source provided from the power supply 106.

Referring now to FIG. 2, there is illustrated the same MCU device chip 100, except in this case, the MCU 104 and other digital peripheral devices are provided a regulated voltage from a boost converter regulator 204. The boost regulator converter 204 increases a voltage supply provided by a battery 202. The battery 202 may provide a voltage level of, for example, 0.9 volts. The MCU 104 and other internal digital peripheral devices require an operating voltage of 1.8 volts in order to function properly. In order to achieve this voltage level, the boost converter 204 increases the voltage of the supplied 0.9 volt signal and regulates a 1.8 volt output voltage to the MCU 104 and to an external output pin 206. The provision of the regulated voltage to only the MCU 104 or to both the MCU 104 and external pin 206 is controlled by the MCU 104 and associated control register. In the mode wherein the regulated 1.8 volt signal is applied to both the MCU 104 and output pin 206, the MCU 104 draws an output current of approximately 5 milliamps while the external pin is provided a current level of approximately 30 milliamps.

Referring now to FIG. 3, there is illustrated a schematic diagram of a standard configuration of a boost converter 204. The input voltage is provided at node 302 through a first side of inductor 304. Inductor 304 is connected to node 306 at its opposite end. Node 306 is connected to the anode of diode 308. The cathode of diode 308 is connected to node 310 which is also the output voltage node $V_{OUT}$. A capacitor 312 is connected between node 310 and ground. Also connected to sample the output voltage on node 310 is a switch control circuit 314. The switch control circuit 314 controls a transistor switch 316 having its gate connected to the output of the switch control 314 and connected between node 306 and ground.

One problem with the use of this configuration of a boost converter 204 on-chip with a microcontroller unit 104 results from the fact that the diode 308 will cause a great deal of losses at low voltage inputs. In order to alleviate the problems caused by the losses associated with diode 308, a zero volt turn-on rectifier 402, as illustrated in FIG. 4, may be substituted for the diode 308 within the boost converter 204. The zero volt turn-on rectifier 402 is connected between nodes 306 and 310 just as the diode 308 would be. The rectifier 402 consists of a transistor 404 having its drain/source path connected between nodes 306 and 310. The transistors gate is connected to the output of a comparator 406. The inputs of the comparator 406 are connected to the nodes 306 and 310 respectively. The polarities of the comparator 406 depend on whether the switch is NMOS or PMOS. With an NMOS switch, the comparator's left input is positive and the right input is negative; with a PMOS switch, the comparator input polarities are swapped. The zero volt turn-on rectifier is conductive when voltage on node 306 is higher than the voltage on node 310. While the zero volt turn-on rectifier 402 greatly reduces the losses over those of the diode 308, there are still losses within the circuit due to the resistance $R_{DSON}$ of the transistor 404.

Referring now to FIG. 5, there is illustrated the operating efficiency versus load current for the boost converter 204 including the rectifier 402 described herein above. As can be seen, the efficiency response 502 decreases as the load current $I_{LOAD}$ decreases. Varying load currents can be caused by differences in the value of the output loading impedance 313. The smaller load impedance the larger the capacitor is provided to reduce output ripple, but a larger current level is provided. Likewise, the higher load impedance provides a greater resistance but less current. The efficiency is defined as output power ($V_{OUT}*I_{LOAD}$) divided by input power, and since the switch control circuit 314 and comparator 406 consume some input power at all values of $I_{LOAD}$, the efficiency will be lower at small values of $I_{LOAD}$. Most of the power consumed by the switch control circuit 314 and comparator 406 is used to drive the switching transistors 316 and 404, respectively, and the amount of power consumed is proportional to the size of those transistors. The transistors must be sized large enough to accommodate that largest load current needed by the MCU plus any load current delivered to the external pin 206. Thus, if the MCU 104 were operating along the portion of the efficiency response indicated generally by the circle 504 this would be highly undesirable, as the desire is for the boost regulator to operate at a highest possible efficiency no matter what the load current may be.

By modifying the boost converter 204 as illustrated in FIG. 6, a circuit may be provided that enables the operating efficiencies at various current loads to be altered based upon the selection of one of multiple possible operating configurations. As before, the input voltage is provided to node 302 and to a first side of inductor 304. The output of inductor 304 is connected to node 306. The drain/source path of transistors 602 and 604 are connected between node 306 and output voltage node 310. Transistor 602 and 604 are in parallel. Nodes 306 and 310 are also connected to the inputs of a comparator 406. The output of comparator 406 is coupled to one of the gates of transistors 602 and 604 depending on which transistor and/or transistors are selected by a multiplexer 605 responsive to provided control inputs from the MCU and/or the switch control circuitry 314. The transistors 602 and 604 will comprise transistors of differing sizes. By selecting a larger transistor of the pair of transistors a higher current is provided at the output node 310. Likewise, the selection of the smaller transistor provides a lower current at the output at the voltage output node 310. The different currents help to affect the efficiency curve. Also connected to the voltage output node 310 is the switch control circuit 314. The output of the switch control circuit 314 is connected to each of the gates of transistors 606 and 608. Transistor 606 and 608 are connected in parallel with their drain/source paths connected between node 306 and ground. These transistors 606 and 608 are also of different sizes that provide different current levels through them individually and/or in combination causing alternatives of the efficiency curve. Control register bits may be selected to control the selection between transistors 608 and 606 and 602 and 604, respectively. By selecting larger transistors of each of the transistor pairs a higher current flow may be achieved through the selected transistors. Likewise, by selecting a smaller transistor of the transistor pair a lower current may be achieved. Those selections are determined by the control register bits in response to the output load current $I_{LOAD}$, and thus, alter the efficiency response of the boost regulator.

As illustrated in FIG. 7, by selecting a first transistor in each of the transistor pairs, a first efficiency response 702 may be achieved. Likewise, if the other transistors in each transistor pair are selected, a second efficiency response 704 may be achieved. If the MCU were operating in the area illustrated generally by 706, the transistors providing the efficiency response illustrated by 704 would be selected as this would provide the highest operating efficiency rather than that provided by the efficiency response indicated by 702. The MCU 104 can control the selection of the transistor 602 through 608 by setting appropriate control bits within associated control registers. While FIG. 6 has illustrated the use of a pair of transistors at two locations providing two different efficiency responses, it should be realized that many additional transistors could be utilized to provide more than two efficiency responses within the boost converter 204.

Since the power consumption of the MCU and its analog and digital peripheral devices is dependent on the values of various control bits, it is possible to add logic that provides for automatic selection of the optimum efficiency response. For example, it is well known in the art that the operating current of synchronous CMOS digital logic is substantially proportional to the clock rate. Since the system clock rate of the MCU is typically determined by the settings of bits in one or more control registers, the states of those bits can be used to select the optimum efficiency response for the boost converter. Such automatic selection may be implemented either in digital hardware or in software code. Similar automatic selection of the optimum efficiency can be made responsive to the values of any other control bits that affect the load current of the boost converter, such as the enabling or disabling of analog or digital peripherals, and the configuration of any external devices that are powered by the boost converter. The selection of optimum efficiency response may also be made responsive to changes in the operating environment. For example, many MCU devices include an analog-to-digital converter (ADC) that is able to measure quantities such as temperature or battery voltage. If the power consumption of the MCU or peripherals were dependent on those quantities, then it would be advantageous for the MCU to use that information to select the optimum efficiency response.

Figure 8:
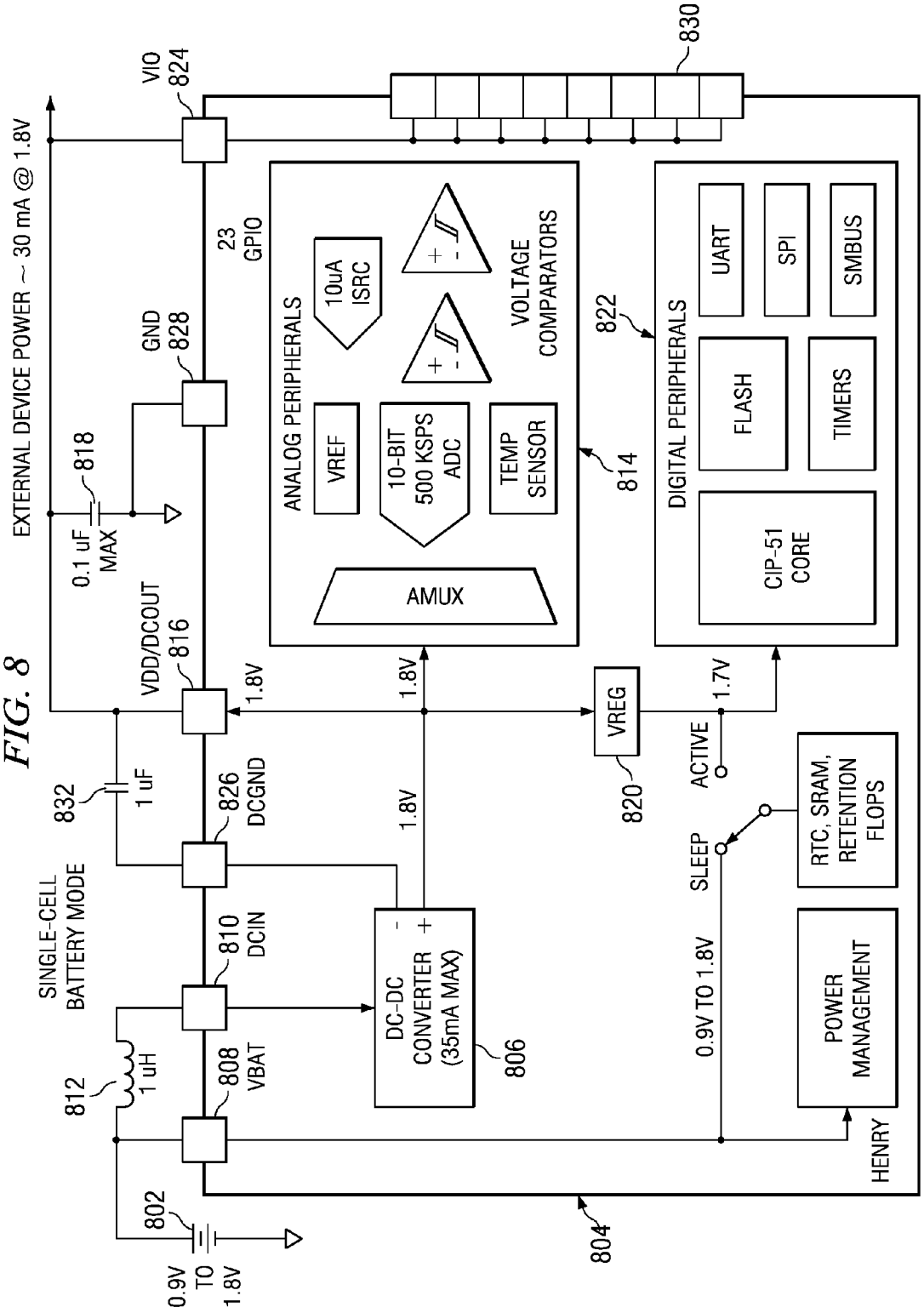
FIG. 8 is a block diagram of a MCU device chip configured to include the operation of a boost converter.

The on-chip boost converter described herein above may be implemented in numerous single chip MCU devices, for example, such as that described in co-pending U.S. patent application Ser. No. 11/301,579 entitled "MCU With Low Power Mode of Operation", which is incorporated herein by reference. The boost converter configuration described herein may be utilized in numerous configurations of single-chip MCU devices such as those illustrated in FIGS. 8 and 9. FIG. 8 illustrates a configuration of an integrated system on a chip wherein a single cell battery 802 is connected to the single-chip MCU device 804. In this case, since the single cell battery 802 provides voltages from 0.9 volts to 1.8 volts, a boost converter 806 is required to regulate the voltage up to 1.8 volts. In this case, the boost converter 806 is referred to as a DC to DC converter. The input voltage is provided to an input pin VBAT 808 and to an input pin DCIN 810 through inductor 812. The input voltage signal is applied to the boost converter 806 wherein it is regulated to a steady 1.8 volt signal. The 1.8 volt signal is provided to various analog peripherals 814 operating within the single-chip MCU devices such as that disclosed in co-pending U.S. patent application Ser. No. 11/301,579 entitled "MCU With Low Power Mode of Operation".

Figure 9:
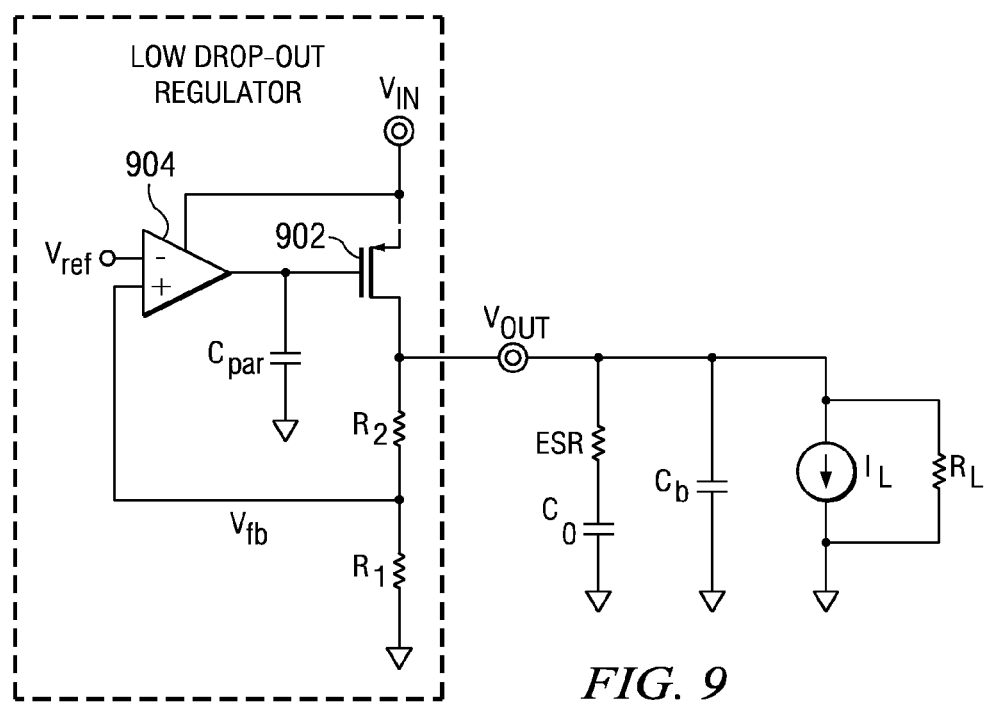
FIG. 9 is a schematic diagram of a low drop out regulator.

The 1.8 volt signal is also provided to pin 816 and through capacitor 818 to ground. The 1.8 volt regulated voltage from the boost converter 806 is also provided to a low drop out (LDO) regulator 820. Low dropout regulator 820 is a DC linear voltage regulator which has a very small input/output differential voltage. Referring now also to FIG. 9, there is illustrated a schematic diagram of an LDO regulator 820. It includes a power FET 902, connected between the input voltage node Vin and the output voltage node Vout, and a differential amplifier 904. A positive input of the differential amplifier 904 monitors a percentage of the output as determined by a resistor ratio of R1 and R2. The resistors R1 and R2 are connected in series between the output voltage node Vout and ground. The positive input of the differential amplifier connects to the node interconnecting resistors R1 and R2. The second input to the differential amplifier is from a stable voltage reference Vref (i.e., band gap reference). The output voltage rises to high relative to the reference voltage, the drive to the gate of the power FET 902 changes so as to maintain a constant output voltage. The LDO regulator 820 down converts the regulated voltage from the boost regulator 806 to a voltage level necessary for operation of the digital peripherals 822 of the single-chip MCU device 804. Since only a single cell battery providing voltages between 0.9 volts and 1.8 volts was used to power the single-chip MCU device 804, the boost converter 806 was necessary to increase the provided voltage to a regulated voltage level necessary to operate the analog peripherals 814 of the single-chip MCU device 804. The LDO regulator 820 is required to lower the voltage to a level necessary for operation of the digital devices. A decoupling capacitor 832 is connected between the DC ground pin 826 and the VDD/DCOUT pin 816. The VIO pin 824 is connected to the $V_{OUT}$ voltage providing power to the output pins 830.

Figure 10:
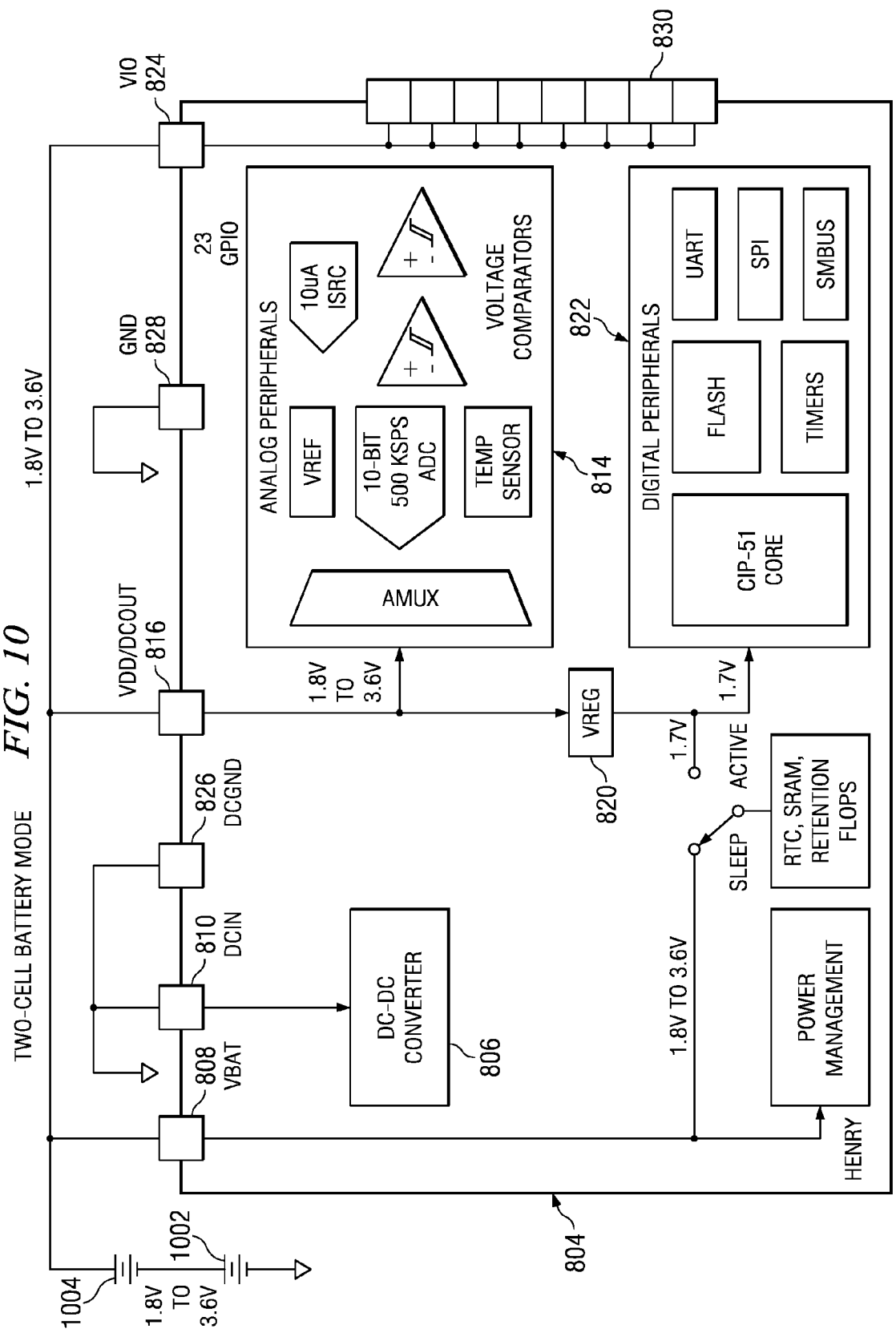
FIG. 10 is a block diagram illustrating the operation of the MCU device chip to disable the operation of the boost converter circuit.

However, as illustrated in FIG. 10, if a two cell battery consisting of cells 1002 and 1004 were used as the power source for the integrated system on a chip, the boost converter 806 would not be necessary as a 1.8 volt to 3.6 volt voltage signal would be sufficient to operate the analog peripherals 814 of the single-chip MCU device 804 without increasing the applied input voltage. In this configuration, the input voltage signal from the battery cells 1002 and 1004 is provided to the VBAT pin 808 and the VDD/DCOUT pin 816 in addition to the VIO pin 824. As before, the ground pin 828 is connected to ground and the VIO pin 824 provides power to the input pins 830. Pin 816 provides the input voltage VIN directly to the LDO voltage regulator 820 for voltage regulation down to 1.7 volts for the digital peripherals 822. Likewise, the 1.8 volt to 3.6 volt signal is applied directly to the analog peripherals 814 to provide for their operation. The boost converter 806 is disabled by connecting the DC input pin 810 and the DC ground pin 826 to ground. The ability to selectively disable or enable the boost converter 806, enables a great deal of flexibility depending on the provided voltage source. The boost converter 806 is disabled when the power source is sufficiently high and enabled when the power source is too low to run on-chip peripheral devices.

It will be appreciated by those skilled in the art having the benefit of this disclosure that this invention provides a MCU with on-chip boost converter. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. An integrated system on a chip, comprising:
a microcontroller unit for performing predefined digital processing functions on the chip, said processing circuitry operating responsive to a regulated voltage;
off-chip reactive components; and
an on-chip boost converter controller circuit connected only to the off-chip reactive components for generating the regulated voltage responsive to an off-chip voltage provided by an off-chip voltage source, wherein the regulated voltage is greater than the off-chip voltage, wherein the on-chip boost converter circuit is configured to operate in a first mode of operation providing a first power efficiency response and to operate in a second mode of operation providing a second power efficiency response wherein the on-chip boost converter controller circuit further comprises:
a zero volt turn-on rectifier, wherein the zero volt turn-on rectifier further includes a first transistor associated with the first mode of operation and a second transistor associated with the second mode of operation, the first and second transistors selected responsive to control signals provided by the microcontroller unit.

2. The integrated system of claim 1, further including an output pin connected to the regulated voltage to selectively provide the regulated voltage to an external load.

3. The integrated system of claim 1, wherein the off-chip reactive components further comprise:
an inductor connected to receive the off-chip voltage;
a capacitor connected to a regulated voltage output node.

4. The integrated system of claim 3, wherein the on-chip boost converter controller circuit further comprises:
a zero volt turn-on rectifier connected between the inductor and the output voltage node; and a transistor switch connected between an input of the zero volt turn-on rectifier and ground; and switching control circuitry for controlling the transistor switch responsive to the regulated voltage.

5. The integrated system of claim 1, wherein the on-chip boost converter circuit further comprises:

an inductor connected to receive the off-chip voltage;

a load capacitor connected to a regulated voltage output node;

a plurality of transistor switches connected in parallel between an input of the zero volt turn-on rectifier and ground, wherein a first transistor switch of the plurality of transistor switches is a associated with the first mode of operation and a second transistor of the plurality of transistor switches is associated with the second mode of operation, the first and second transistor switches selected responsive to the control signals provided by the microcontroller unit; and switching control circuitry for controlling at least one transistor switch of the plurality of transistor switches responsive to the regulated voltage.

6. The integrated system of claim 5, wherein the control signals generated by the processing circuitry are generated responsive to a power efficiency of the integrated system on a chip circuitry.

7. The integrated system of claim 1, further including a low drop out regulator for generating a second regulated voltage responsive to the regulated voltage provided by the on-chip boost converter circuit in a third mode of operation and for generating the second regulated voltage responsive to the off-chip voltage in a fourth mode of operation, wherein the second regulated voltage is less than the regulated voltage.

8. The integrated system of claim 7, wherein the boost regulator may be disabled in the second mode of operation.

9. An integrated system on a chip, comprising:

processing circuitry for performing predefined digital processing functions on the chip, said processing circuitry operating responsive to a regulated voltage;

off-chip reactive components;

an on-chip boost converter controller circuit connected only to the off-chip reactive components for generating the regulated voltage responsive to an off-chip voltage provided by an off-chip voltage source, wherein the regulated voltage is greater than the off-chip voltage, wherein the on-chip boost converter controller circuit further comprises:

a zero volt turn-on rectifier, wherein the zero volt turn-on rectifier further includes a first transistor associated with a first mode of operation and a second transistor associated with a second mode of operation, the first and second transistors selected responsive to control signals provided by the processing circuitry;

a low drop out regulator for generating a second regulated voltage responsive to the regulated voltage provided by the on-chip boost converter circuit in a third mode of operation and for generating the second regulated voltage responsive to the off-chip voltage in a fourth mode of operation, wherein the second regulated voltage is less than the regulated voltage; and wherein the boost regulator may be disabled in the second mode of operation.

10. The integrated system of claim 9, further including an output pin connected to the regulated voltage to selectively provide the regulated voltage to an external load.

11. The integrated system of claim 9, wherein the off-chip reactive components further comprise:

an inductor connected to receive the off-chip voltage; and a capacitor connected to a regulated voltage output node.

12. The integrated system of claim 11, wherein the on-chip boost converter controller circuit further comprises:

a transistor switch connected between an input of the zero volt turn-on rectifier and ground; and switching control circuitry for controlling the transistor switch responsive to the regulated voltage.

13. The integrated system of claim 11, wherein the on-chip boost converter circuit further comprises:

an inductor connected to receive the off-chip voltage;

a load capacitor connected to a regulated voltage output node;

a plurality of transistor switches connected in parallel between an input of the zero volt turn-on rectifier and ground, wherein a first transistor switch of the plurality of transistor switches is associated with the first mode of operation and a second transistor of the plurality of transistor switches is associated with the second mode of operation, the first and second transistor switches selected responsive to the control signals provided by the processing circuitry; and switching control circuitry for controlling at least one transistor switch of the plurality of transistor switches responsive to the regulated voltage.

14. The integrated system of claim 13, wherein the control signals generated by the processing circuitry are generated responsive to a power efficiency of the integrated system on a chip circuitry.

15. An integrated system on a chip, comprising:

processing circuitry for performing predefined digital processing functions on the chip, said processing circuitry operating responsive to a regulated voltage;

off-chip reactive components, wherein the off-chip reactive components further comprise:

an inductor connected to receive the off-chip voltage;

a capacitor connected to a regulated voltage output node;

an on-chip boost converter controller circuit connected only to the off-chip reactive components for generating the regulated voltage responsive to an off-chip voltage provided by an off-chip voltage source, wherein the regulated voltage is greater than the off-chip voltage, wherein the on-chip boost converter controller circuit further comprises:

a zero volt turn-on rectifier connected between the inductor and the output voltage node, wherein the zero volt turn-on rectifier further includes a first transistor associated with a first mode of operation and a second transistor associated with a second mode of operation, the first and second transistors selected responsive to control signals provided by the processing circuitry;

a plurality of transistor switches connected in parallel between an input of the zero volt turn-on rectifier and ground, wherein a first transistor switch of the plurality of transistor switches is associated with the first mode of operation and a second transistor of the plurality of transistor switches is associated with the second mode of operation, the first and second transistor switches selected responsive to the control signals provided by the processing circuitry; and switching control circuitry for controlling at least one transistor switch of the plurality of transistor switches responsive to the regulated voltage.

16. The integrated system of claim 15, further including an output pin connected to the regulated voltage to selectively provide the regulated voltage to an external load.

17. The integrated system of claim 15, wherein the first mode of operation provides a first power efficiency response and to operate in a second mode of operation providing a second power efficiency response.

18. The integrated system of claim 15, wherein the control signals generated by the processing circuitry are generated responsive to a power efficiency of the processing circuitry.

19. The integrated system of claim 15, further including a low drop out regulator for generating a second regulated voltage responsive to the regulated voltage provided by the on-chip boost converter circuit in a third mode of operation and for generating the second regulated voltage responsive to the off-chip voltage in a fourth mode of operation, wherein the second regulated voltage is less than the regulated voltage.

20. The integrated system of claim 17, wherein the boost regulator may be disabled in the second mode of operation.

21. An integrated system on a chip, comprising:
- processing circuitry for performing predefined digital processing functions on the chip, said processing circuitry operating responsive to a regulated voltage; and
- an on-chip boost converter circuit including at least one switch for generating the regulated voltage responsive to an off-chip voltage provided by an off-chip voltage source, wherein the regulated voltage is greater than the off-chip voltage, wherein the on-chip boost converter circuit further comprises:
  - a zero volt turn-on rectifier, wherein the zero volt turn-on rectifier further includes a first transistor associated with a first mode of operation and a second transistor associated with a second mode of operation, the first and second transistors selected responsive to control signals provided by the processing circuitry.

22. The integrated system of claim 21, further including an output pin connected to the regulated voltage to selectively provide the regulated voltage to an external load.

23. The integrated system of claim 21, further including an input pin connected to an external inductor and an output pin connected to an external capacitor to provide the regulated voltage.

24. The integrated system of claim 21, wherein the on-chip boost converter circuit further comprises:
- a transistor switch connected between an input of the zero volt turn-on rectifier and ground; and
- switching control circuitry for controlling the transistor switch responsive to the regulated voltage.

\* \* \* \* \*